United States Patent [19]
Shindo

[11] Patent Number: 5,456,592
[45] Date of Patent: Oct. 10, 1995

[54] INJECTION MOLD PROBE AND RUNNERLESS INJECTION MOLD

[75] Inventor: Hiraku Shindo, Yonezawa, Japan

[73] Assignee: Seiki Kabushiki Kaisha, Yamagata, Japan

[21] Appl. No.: 196,957

[22] Filed: Feb. 15, 1994

[30]     Foreign Application Priority Data

Feb. 16, 1993   [JP]   Japan .................................. 5-026680

[51] Int. Cl.⁶ ................................................. B29C 45/20
[52] U.S. Cl. ...................................... 425/549; 264/328.15
[58] Field of Search ..................................... 425/547, 549; 264/328.15

[56]                  References Cited

U.S. PATENT DOCUMENTS

| | | | |
|---|---|---|---|
| 4,230,934 | 10/1980 | ter Beek et al. | 425/547 |
| 4,516,927 | 5/1985 | Yoshida | 425/549 |
| 4,913,912 | 4/1990 | Leverenz | 425/549 |
| 5,238,391 | 8/1993 | Teng | 425/547 |

Primary Examiner—Tim Heitbrink
Attorney, Agent, or Firm—Elliot M. Olstein; Raymond J. Lillie

[57]                ABSTRACT

An injection mold probe and a runnerless injection mold, in which the injection mold has a tip heater for intermittently heating a tip portion of the probe and a body heater for heating a body portion of the probe. The heaters being furnished with power from a single power source. The injection mold probe has its tip portion provided with a tip heater, which is made of platinum or a platinum alloy with the electric resistance thereof increased quickly with temperature increase caused by energization and its body portion provided with a body heater, which is made from a nicrome wire with the electric resistance thereof less increased with temperature increased caused by energization, the tip and body heaters being connected in series. The probe is mounted in a runner portion of a die with its tip portion disposed near a gate portion of the die. The runnerless injection mold comprises a power source unit for controlling power in synchronism to a molding process to serially supply power to the tip and body heaters.

4 Claims, 13 Drawing Sheets

INJECTION MOLD PROBE AND RUNNERLESS INJECTION MOLD

BACKGROUND OF THE INVENTION

1. Field of the Invention

This invention relates to an injection molder probe, which has heating means for heating a hot runner portion as fused resin path and also intermittently heating a gate portion to opening and closing the gate, and also to a runnerless injection molder provided with the same probe.

2. Brief Description of the Prior Art

Figure 13:
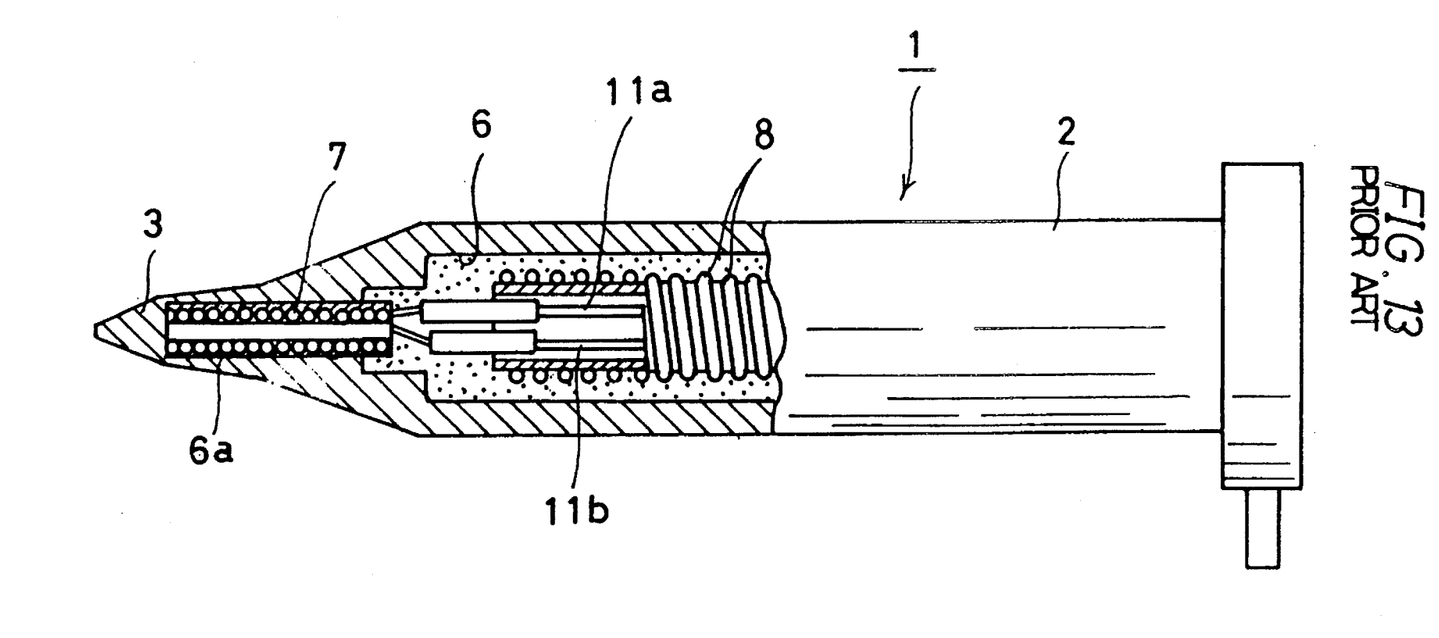
FIG. 13 is a side view, partly broken away, showing a prior art probe.

FIG. 13 is a sectional view, partly broken away, showing a sharp heat generator (hereinafter referred to as probe) for constructing a hot runner, as disclosed in Japanese Utility Model Publication S60-28569. With reference to this Figure, the well-known injection molder probe structure will be described.

Designated at 2 is an outer cylinder (i.e., body portion) made of a heat-bearing metal, for instance stainless steel, at 6 an inner space in the outer cylinder, and at 6a an axial bore formed in the metal outer cylinder 2 along the axis thereof and hear a sharp tip portion 3. In the bore 6a, a heat generator 7 comprising a coil of a heat generating wire is disposed, and it is externally furnished with power through leads 11a and 11b for locally heating the sharp tip portion 3. A separate heater 8 is accommodated in the inner space 6 of the metal outer cylinder for holding a synthetic resin in the runner in a fused state at all times.

In a runnerless injection molder, a probe 1 having the above construction is mounted in dies. A gate portion heating to the cavity is locally heated with the sharp tip portion 3 for instantly fusing the synthetic resin that has been cooledly solidified to hold the gate closed, thus opening the gate, whereby the fused resin is injected into the cavity in an injection molding operation to obtain a molding. By cutting or restricting power supply to the heat generator 7, the fused resin in the gate portion is solidified or half solidified, thus closing the gate.

However, with the runnerless injection molder with the above prior art probe 1 mounted in the dies, the heat generator 7, which is for intermittently heating the sharp tip portion 3 of the probe 1, and the heater 8, which is for heating the metal outer cylinder at all times, have to be separately power supply controlled, thus posing the problems of requiring an complicated, large size and expensive power supply unit. In addition, it is considerably difficult to provide a reduced size probe.

This invention seeks to solve the above problems inherent in the prior art, and its object is to provide an injection molder probe and a runnerless injection molder, in which a simplified structure heater for intermittently heating the tip portion of the probe and a heater for heating the body portion of the probe are furnished with power from a single power source.

SUMMARY OF THE INVENTION

To attain the above object of the invention, there is provided a probe for injection molding dies, which comprises a tip heater provided in a tip portion of the probe for locally heating the tip portion and a body heater provided in a tip portion of the probe for heating the body portion, the tip heater being made of a material with the electric resistance thereof increased with temperature increase caused by energization, the body heater being made of a material with the electric resistance thereof less increased than the tip heater with temperature rise caused by energization, the tip and body heaters being connected in series with a power source for power supply control.

Further, to attain the above object of the invention, there is provided a runnerless injection molder, in which the injection molder probe is mounted in a runner portion of the dies with the tip portion of the probe disposed near a gate portion of the dies, and which further comprises a power source unit connected in series with the top and body heaters for power control in synchronism with a molding process.

With the above structure of the injection molder probe according to the invention, with the tip heater the electric resistance is increased at a greater rate than the body heater with temperature increase caused by energization. Thus, with temperature increase caused by the energization, the resistance of the tip heater is increased at a higher rate than that of the body heater. However, since the tip and body heaters are connected in series and carry an equal current, the power consumption ratio between the tip and body heaters is ranged, that is, the power consumption ratio of the tip heater is increased. It is thus possible to quickly and sharply heat the tip portion of the probe. Meanwhile, the effect of heating of the body portion of the probe is not substantially changed.

In the runnerless injection molder according to the invention, in which the injection molder probe having the above functions is mounted in the runner portion of the dies with the tip portion disposed near the gate portion of the dies, the control of supply of power (either voltage or current) to the tip and body heaters in series is made in synchronism to the injection molding cycle. Thus, the temperature of the tip portion of the probe, i.e., the synthetic resin in the gate portion, can be increased quickly to open the gate while causing no substantial change in the temperature of the body portion of the probe. Further, cooling means for cooling a cavity portion in the dies of the injection molder is provided to lower the temperature of the gate portion to solidify or half solidify the synthetic resin in the gate portion, thus closing the gate.

DETAILED DESCRIPTION OF THE PREFERRED EMBODIMENTS

Now, the injection molder probe (hereinafter referred to as probe) and runnerless injection molder (hereinafter referred to as injection molder) according to the invention will be described in conjunction with preferred embodiments. Parts like those in the prior art probe noted above are designated by like reference numerals and symbols.

Figure 1:
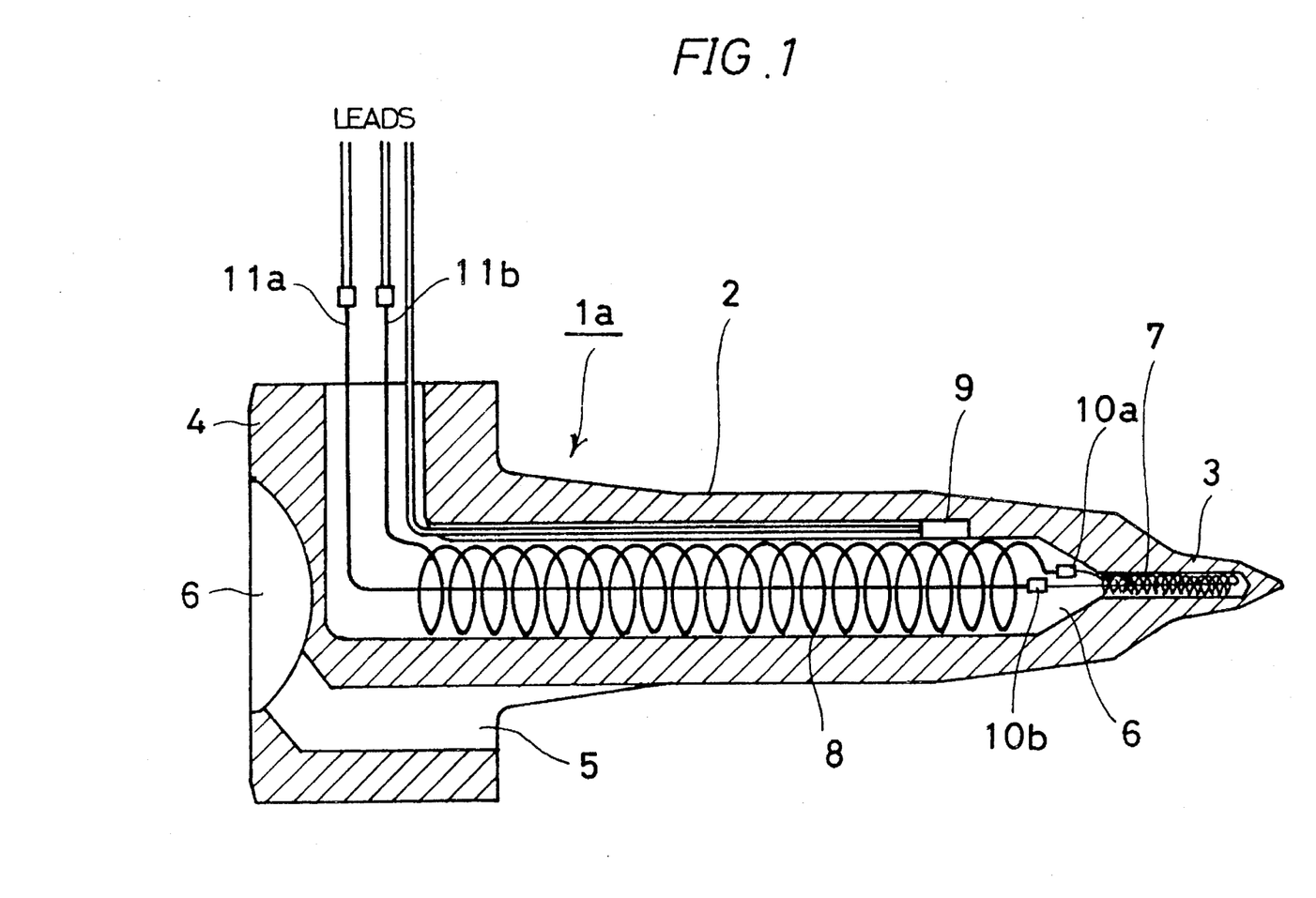
FIG. 1 is a sectional view showing an embodiment of the probe.
Figure 2:
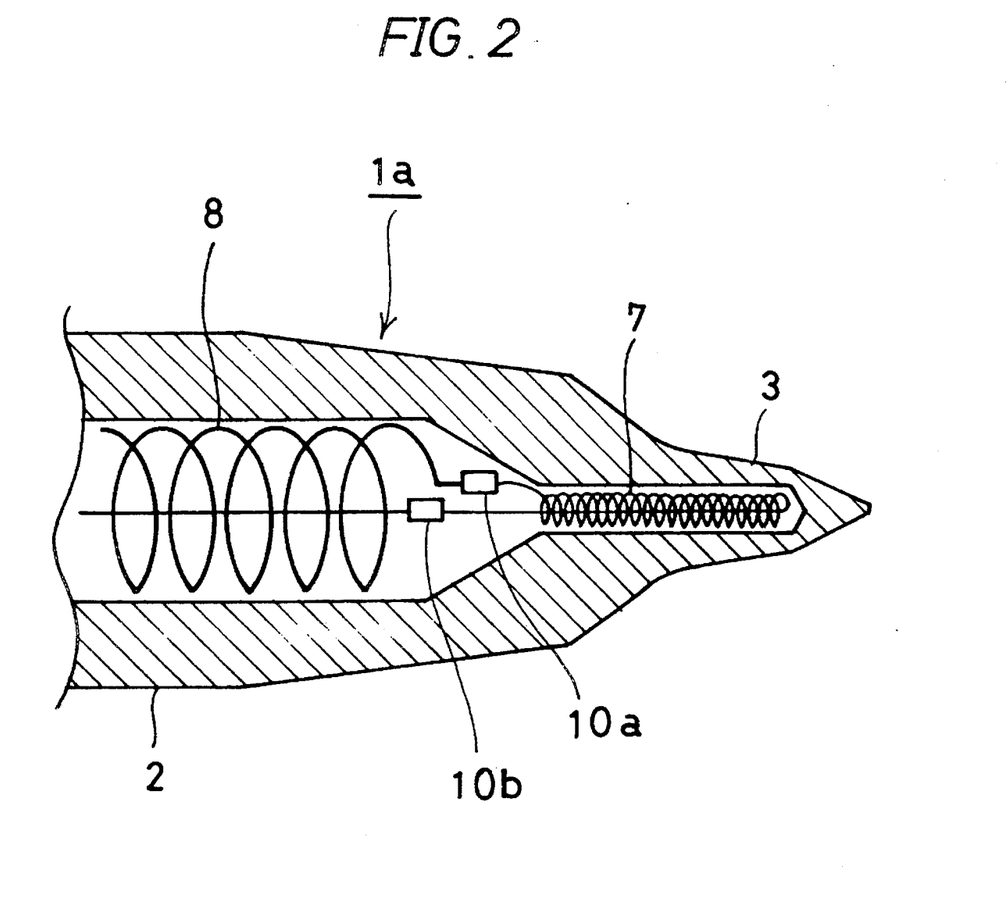
FIG. 2 is a fragmentary enlarged-scale sectional view showing the same embodiment of the probe.
Figure 3:
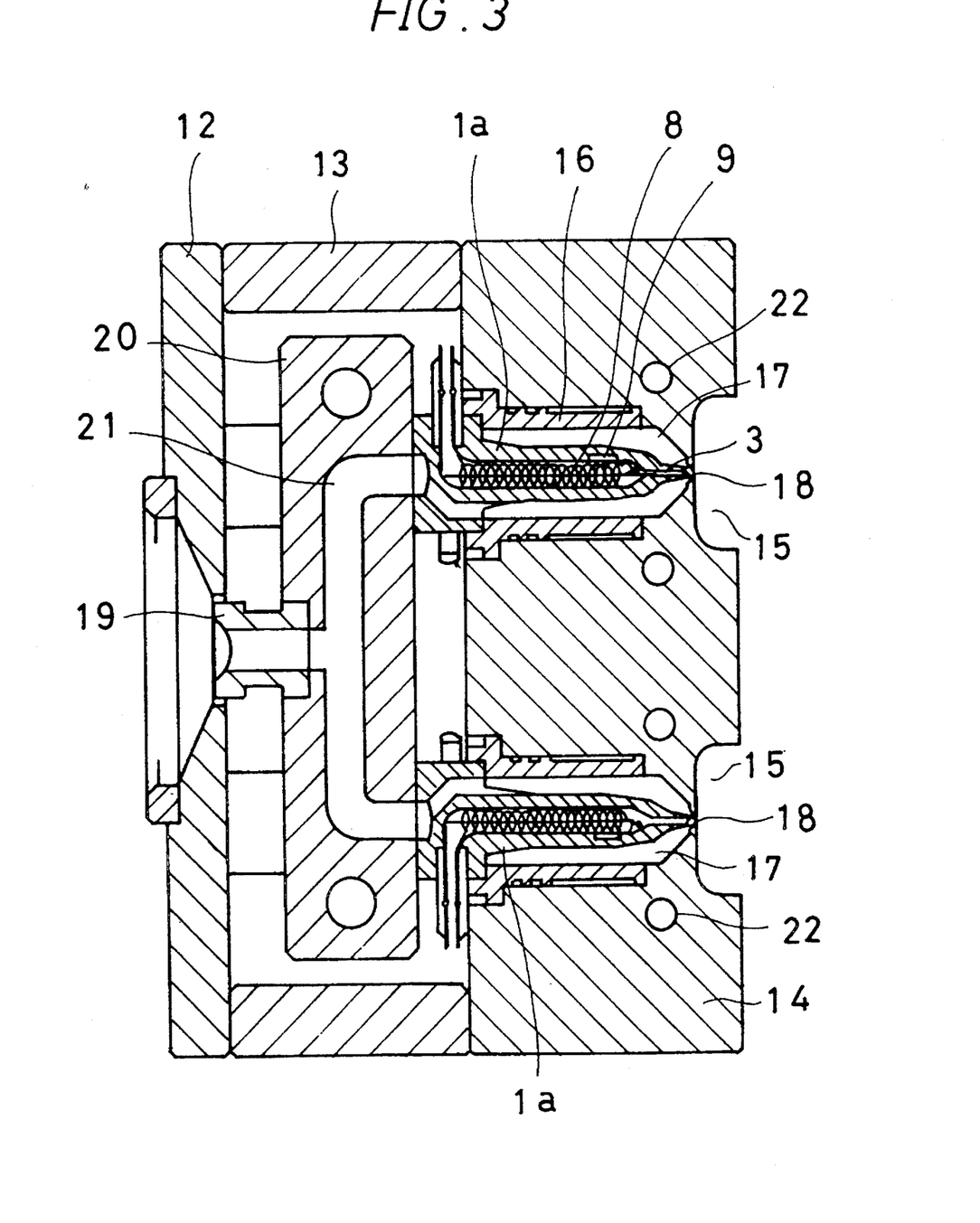
FIG. 3 is a fragmentary sectional view showing an embodiment of the injection molder.

FIG. 1 is a sectional view showing a first embodiment of the probe, FIG. 2 is a fragmentary enlarged scale sectional view of the same probe, and FIG. 3 is a fragmentary sectional view showing an embodiment of the injection molder, i.e., a sectional view of a die with the same probe mounted therein.

The first embodiment of the probe 1a is of an internal heating system, in which injected synthetic resin is heated from the inside of a hot runner path.

Designated at 2 is a body portion of the probe. This portion is molded with a heat-resistant metal. Designated at 3 is a tip portion of the probe. While in the illustrated example this tip portion is molded together with the body portion 2, it is possible to mold the tip portion 3 separately and make it integral with the body portion 2 by fitting it therein. Designated at 4 is a stem portion of the probe, and at 5 a resin flow port for introducing synthetic resin from a sprue bush to a hot runner. Designated at 6 is a heater mounting bore, which extends from the inside of the tip portion 3 of the probe through the inside of the body portion 2 and is open at a side surface of the stem portion 4. A tip heater 7 is inserted in the tip portion 3, and a body heater 8 is inserted in the body portion 2. Designated at 9 is a temperature sensor.

As a feature of this embodiment, the tip heater 7 is a coil of a thin wire of platinum or a platinum alloy with the electric resistance thereof increased extremely with temperature increase, while the body heater 8 is a coil of a nicrome wire with the electric resistance less increased with temperature increase. The tip and body heaters 7 and 8 each have one end connected to a connection member 10a in the heater mounting bore 6. A conductor, which is connected by the connecting member 10b to the tip heater 7, and the other end of the body heater 8 is led out by leads 11a and 11b from the stem portion 4 of the probe to the outside so that a single power source output can supply power to the tip and body heaters 7 and 8 in series with each other.

Now, an embodiment of the injection molder will be described with reference to FIG. 3.

This embodiment of the injection molder is of a runnerless type, with the above embodiment of the probe 1a mounted in a die. The embodiment features a power source unit, which can control the voltage or current in synchronism with the injection molding cycle for serially supply power to the serial tip and body heaters 7 and 8 in the probe 1a. The rest of the structure is similar to those of prior art injection molding and may be of various structures.

Referring to FIG. 3, designated at 12 is a die mounting member of the injection molder. A stationary die 14 is mounted on the die mounting member via a spacer block 13. The die 14 has cavities 15. At each cavity 15, a hot runner 17 is formed by a runner bush fitted in a bottomed bore such as to extend toward the cavity 15. The probe 1a is mounted in the hot runner 17 such that its tip portion 3 is located near a gate 18 which is a resin injection port leading from the hot runner 17 to the cavity 15.

The synthetic resin to be injected is introduced from a nozzle in a thermal injection unit (not shown) and led through a sprue bush 19, a resin port 21 in a manifold 20 and the resin flow bore 5 in the probe 1a to enter the hot runner 17, and thence injected through the gate 18 into the cavity 15 by the tip and body heaters 7 and 8 in the probe 1a, which are power supply controlled in synchronism to the forced injection of synthetic resin from a thermal injection unit (not shown). The die 14 has cooling water ducts 22 for cooling and solidifying the synthetic resin injected into the cavity 15 and also cooling the synthetic resin in the portion of the gate 18.

Now, the characteristics and effects of the tip and body heaters 7 and 8 depending on the materials thereof will be described.

Table below shows the rate of electric resistance increase of nicrome as the material of the body heater 8 and platinum or a platinum alloy as the material of the tip heater 7 in dependence on the temperature increase.

TABLE 1

Ratio of electric resistance increase of heater materials dependent on temperature increase

| Temp. (°C.) | Material | | |
|---|---|---|---|
| | Nicrom (Ni—Cr) | Pure (Pt) | Platinum (Pt—Rh 10%) |
| 0 | 1.000 | 1.000 | 1.000 |
| 100 | 1.013 | 1.392 | 1.166 |
| 200 | 1.025 | 1.778 | 1.330 |
| 300 | 1.040 | 2.141 | 1.490 |
| 400 | 1.049 | 2.499 | 1.646 |
| 500 | 1.053 | 2.844 | 1.798 |
| 600 | 1.048 | 3.178 | 1.947 |
| 700 | 1.044 | 3.500 | 2.093 |
| 800 | 1.046 | 3.810 | 2.234 |
| 900 | 1.055 | 4.109 | 2.370 |
| 1,000 | 1.058 | 4.396 | 2.503 |

Figure 4:
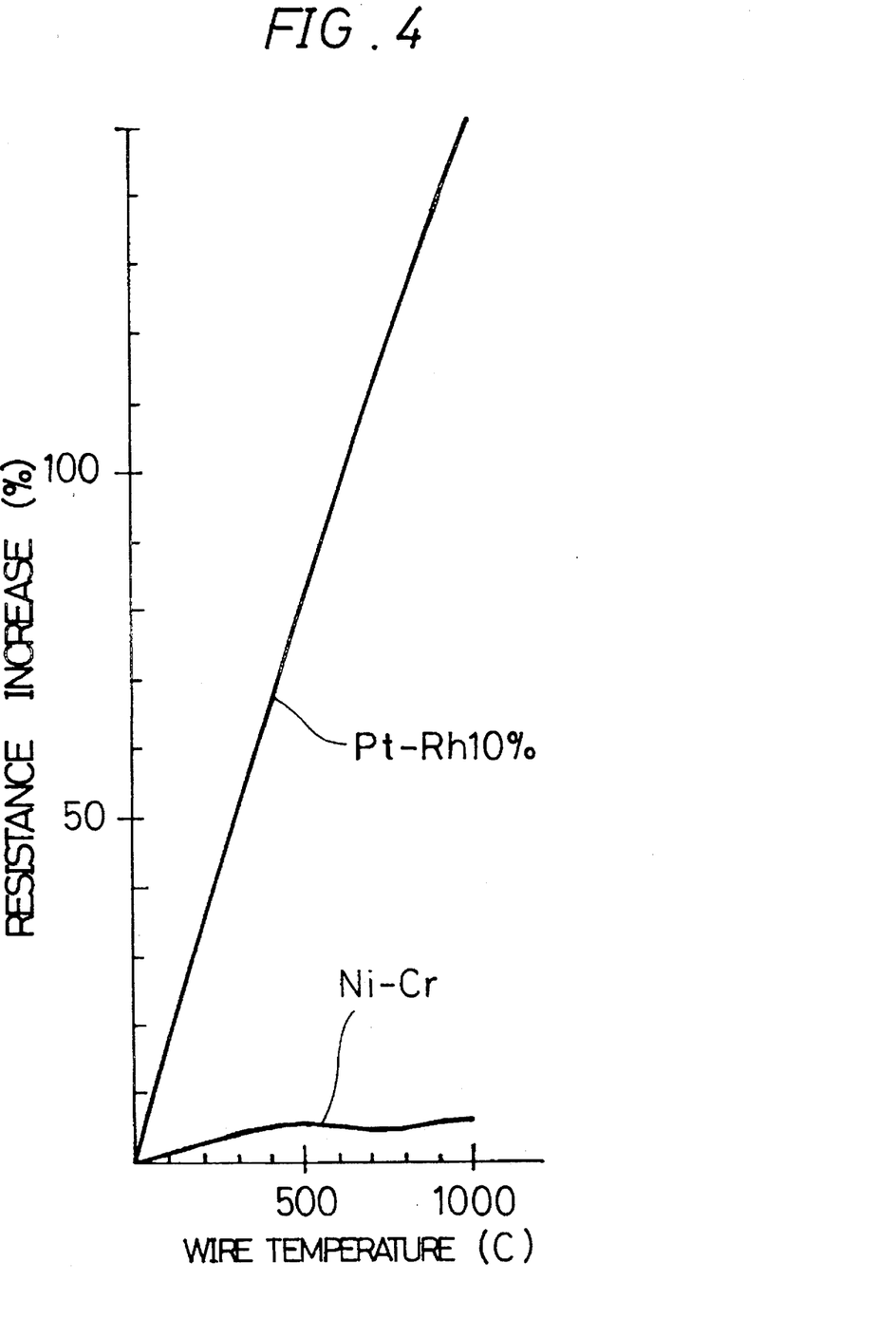
FIG. 4 is a graph showing the electric resistance increase rate of nicrome and a platinum alloy.

FIG. 4 is a graph showing the electric resistance increase rate of nicrome and platinum alloy noted above.

Figure 5:
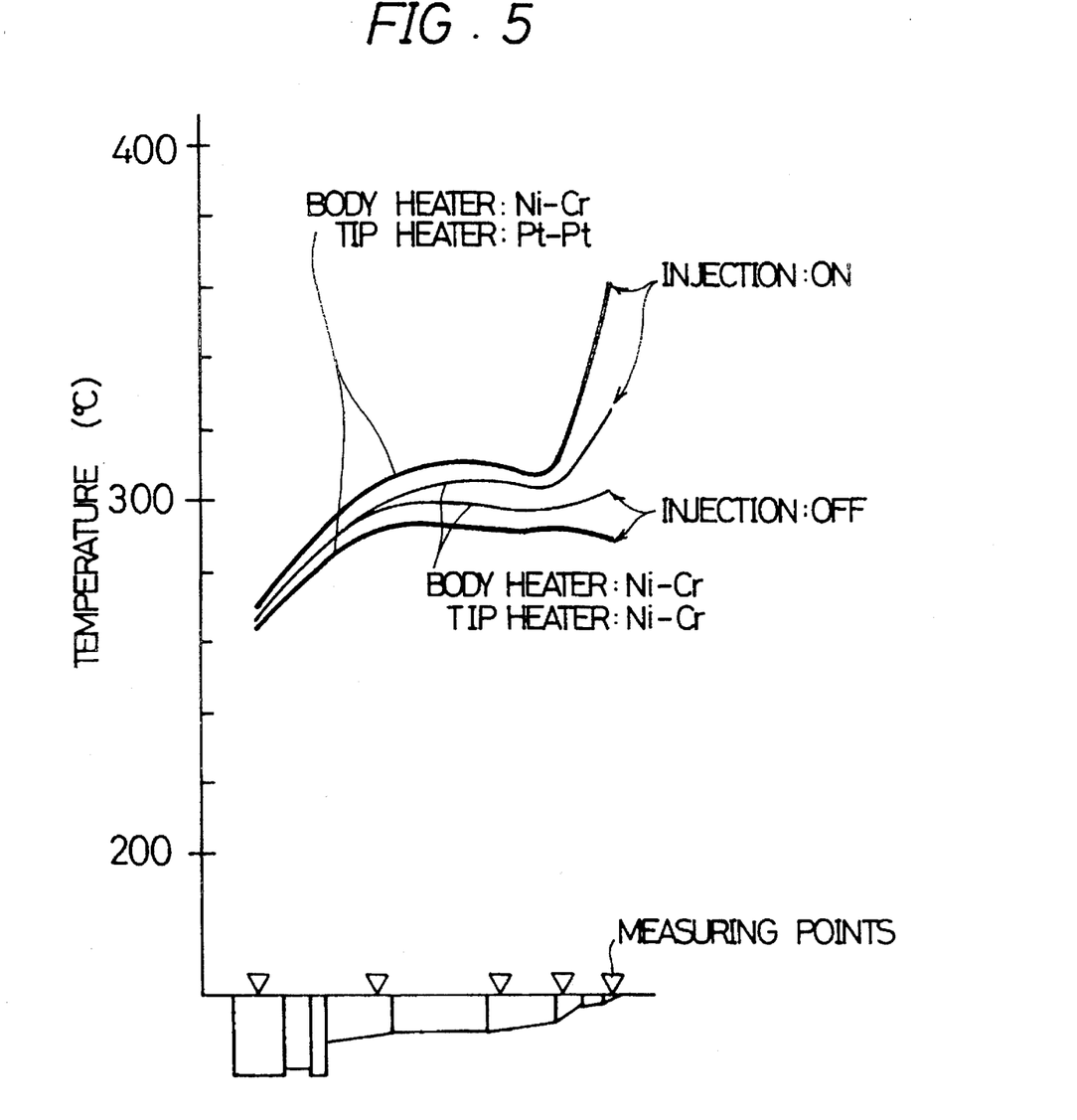
FIG. 5 is a graph showing the results of experiments on the effects of materials of tip and body heaters.

As is seen from the above table and also from FIG. 4, the two heater materials are different in the electric resistance increase rate. That is, with the tip heater 7 the rate of increase of the electric resistance with temperature rise caused by energization is higher than that of the body heater 8. In other words, when the temperature of the heaters is increased by energization, the resistance of the tip heater 7 is increased at a higher rate than that of the body heater 8. Since the tip and body heaters 7 and 8 are connected in series and thus carry the same current, the power consumption ratios of the two heaters are changed, that is, the power consumption ratio of the tip heater 7 is increased. Thus, the tip portion of the probe is heated quickly. On the other hand, the effect of heating on and the temperature of the body portion of the probe is not substantially changed because of a high heat capacity of this portion. This is made clear in the results of experiments shown in FIG. 5.

In this embodiment of the injection molder, in which the probe having the above characteristics is mounted in the die runner portion such that the tip portion is disposed near the gate portion of the die, power (i.e., voltage or current) supplied to the tip and body heaters 7 and 8 in series with each other is controlled in synchronism to the injection molding cycle. Thus, without substantially changing the temperature of the synthetic resin that is heated in the body portion 2, the synthetic resin having been in a half solidified state in the portion of the gate 18 can be quickly increased in temperature to be fused and thus open the gate 18. In this way, the fused resin can be injected for molding into the cavity 15. It is possible to arrange such as to permit power control according to the input from the temperature sensor 9.

The portion of the gate 18 is also cooled through the cooling water ducts 22 for cooling the cavity portions provided in the die 14 of the injection molder. Thus, the synthetic resin in the portion of the gate 18 can be reduced in temperature to a solidified or half solidified state to close the gate 18, thus permitting the molding to be taken out from the dies.

Figure 6:
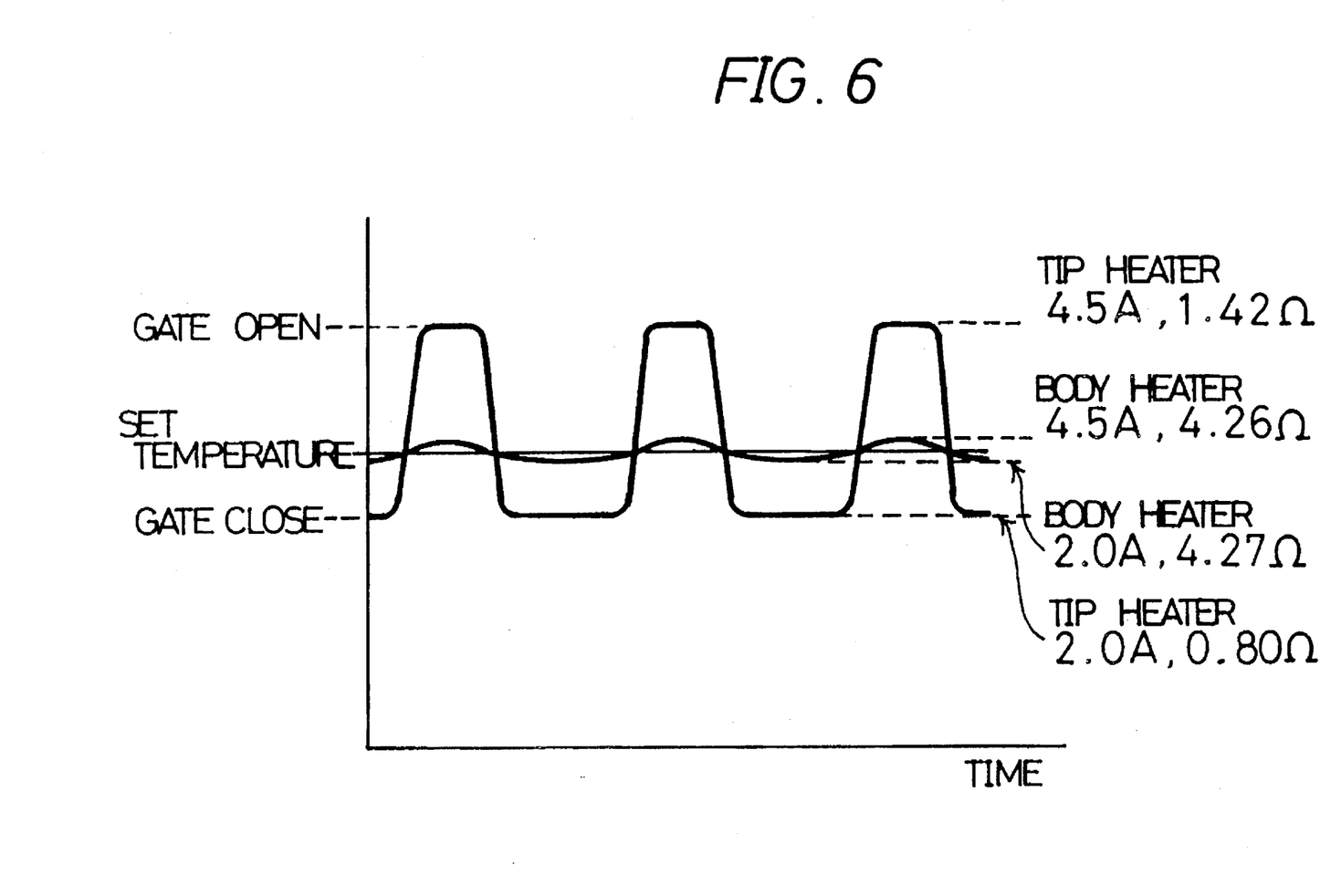
FIG. 6 is a graph showing the results of experiments on the effects of the embodiment tip heater.

FIG. 6 is a view showing experimental result data showing the effect of the tip heater. In this example, the tip heater 7 is made from a platinum alloy wire, while the body heater 8 is made from a nicrome wire.

The data show that with the structure, in which power is supplied to the tip and body heaters 7 and 8 connected in series from a single power source, it is possible to open and close the gate with a current value of 4.5 A when opening the gate and 2.0 A when closing the gate. That is, the power source unit controls the voltage across the two heaters in series to about 25.5 V when opening the gate to about 10.1 V when closing the gate, whereby the heat generation capacity of the tip heater 7 is increased by about nine times while that of the body heater 8 is increased by about five times.

Figure 7:
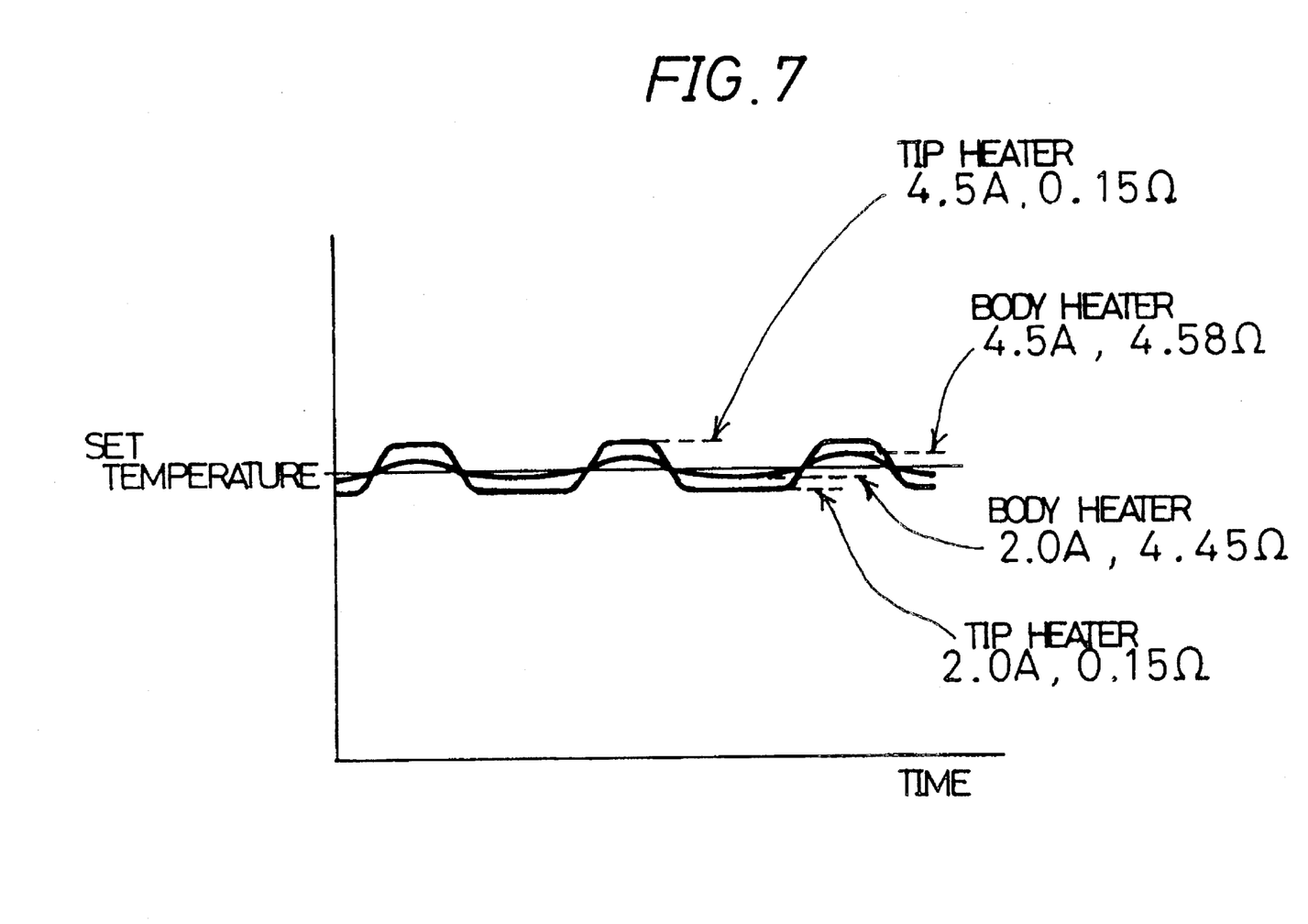
FIG. 7 is a graph showing the results of experiments of a prior art tip heater.

FIG. 7 shows experimental data obtained with a comparative example, in which the tip heater is made from a nicrom wire like the body heater. In this case, the tip heater temperature is not changed so much with the same current values of 4.5 and 2.0 A. The result is quite different from that in the above embodiment, and it is impossible to open and close the gate with the sole power source control.

Figure 8:
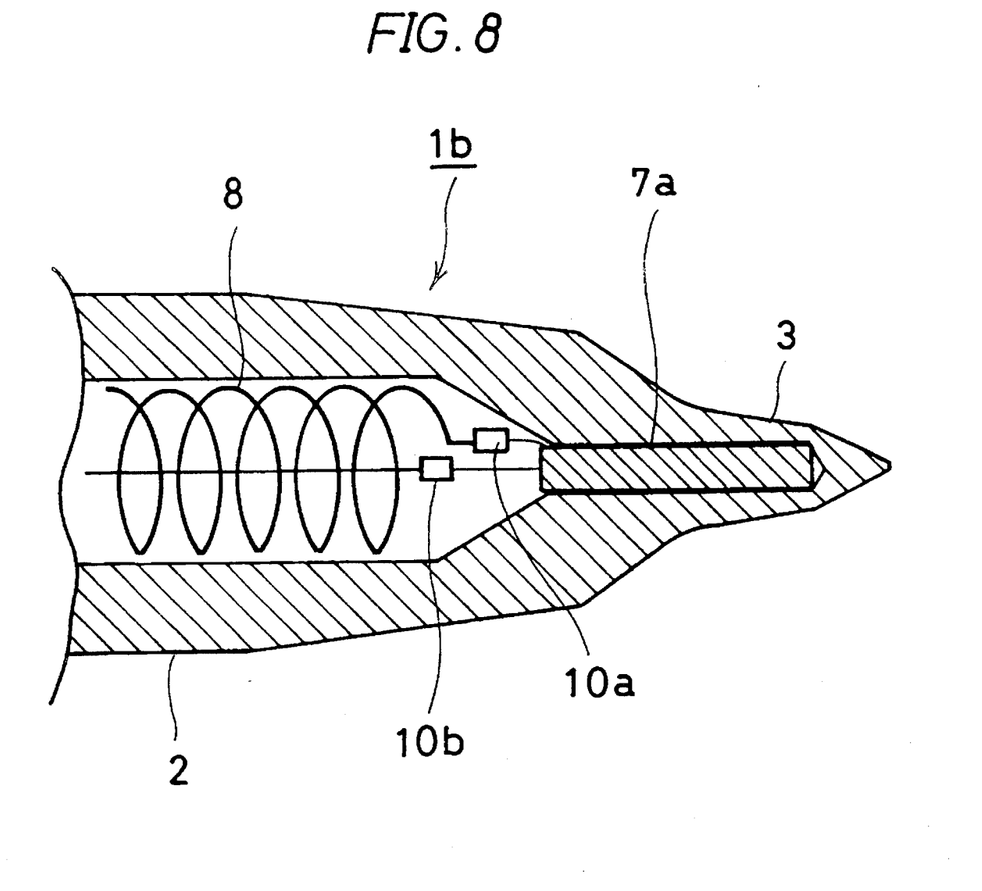
FIG. 8 is an fragmentary enlarged-scale sectional view showing a second embodiment of the probe.
Figure 9:
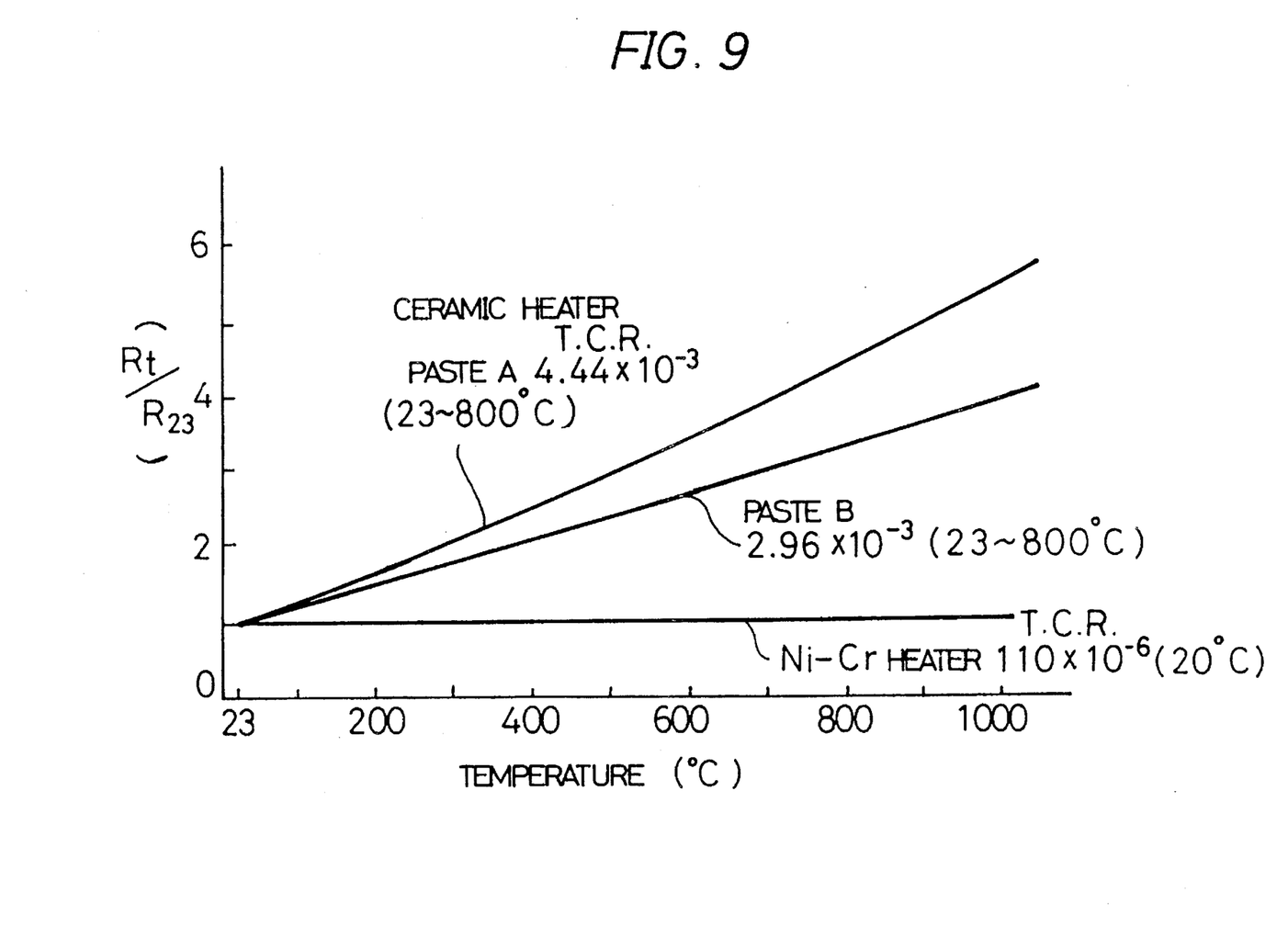
FIG. 9 is a graph showing a characteristics of ceramic heat generators.

FIG. 8 is a fragmentary enlarged-scale sectional view showing a tip portion of a second embodiment of the probe, and FIG. 9 is a graph showing the characteristic of a ceramic heat generator as the material of the tip heater mounted in the probe.

The second embodiment of the probe 1b features that the tip heater 7a mounted in the tip portion 3 is a ceramic heater, the other constitution being like that in the first embodiment.

As shown in FIG. 9, with the tungsten heater (i.e., ceramic heater) constituting the tip heater 7a, compared to the nicrome heater, the rate of increase of the resistance with temperature increase, that is, the rate of temperature increase, is higher. Thus, the normal state can be reached more quickly, and the character of maintaining the normal temperature is more excellent. With the series body heater 8 made of a material which is less subject to resistance changes, such as nicrome or cantal, the probe 1b can be readily obtained at a lower price than the first embodiment while providing substantially the same effects. Further, a runnerless injection molder which incorporates the probe 1b has substantially the same effects as with the previous embodiment of the injection molder.

A modification which has the same effects as above, may be constructed by using a sintered carbon heat generator (binder) as the material of the tip heater 7 and nicrome or cantal as the material of the body heater 8.

Figure 10:
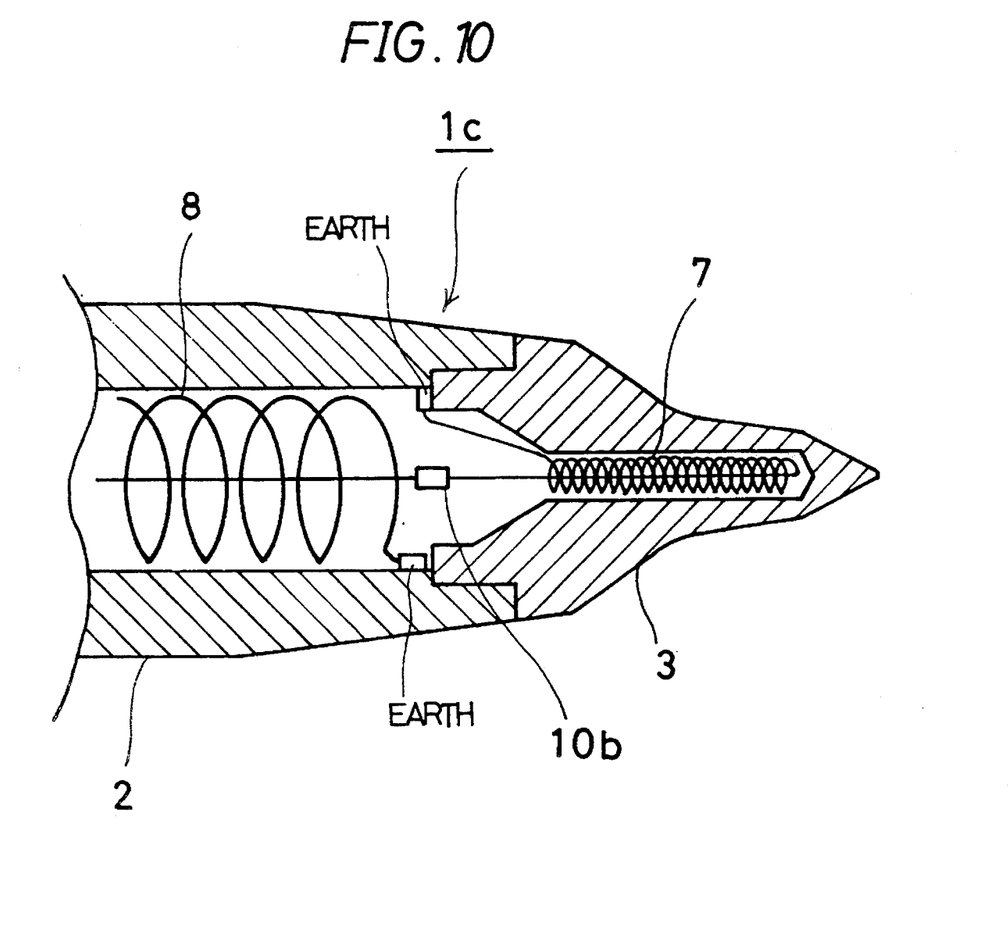
FIG. 10 is a fragmentary enlarged-scale sectional view showing a third embodiment of the probe.

FIG. 10 is a fragmentary enlarged-scale sectional view showing a third embodiment of the probe.

In the first embodiment of the probe 1a described earlier, the tip and body heaters 7 and 8 each have their one end connected in series within the body portion 2 of the probe by using the connection member 10a. In the instant third embodiment of the probe 1c, the tip and body heaters 7 and 8 each have their one end bonded to the inner wall of the body portion 2 of the probe, thus connecting the two heaters in series.

With such low voltage control structure capable of grounding, the two heaters can be readily connected in series, and it is possible to obtain the same effects as in the preceding embodiments.

In the instant illustrated example, the tip portion 3 of the probe is fabricated separately from the body portion 2 and fitted in the same to be made integral. This structure facilitates the operation of bonding one end of each of the tip and body heaters 7 and 8 to the inner wall of the body portion 2 of the probe. This method of connection may also be adopted in the case of the second embodiment of the probe.

Figure 11:
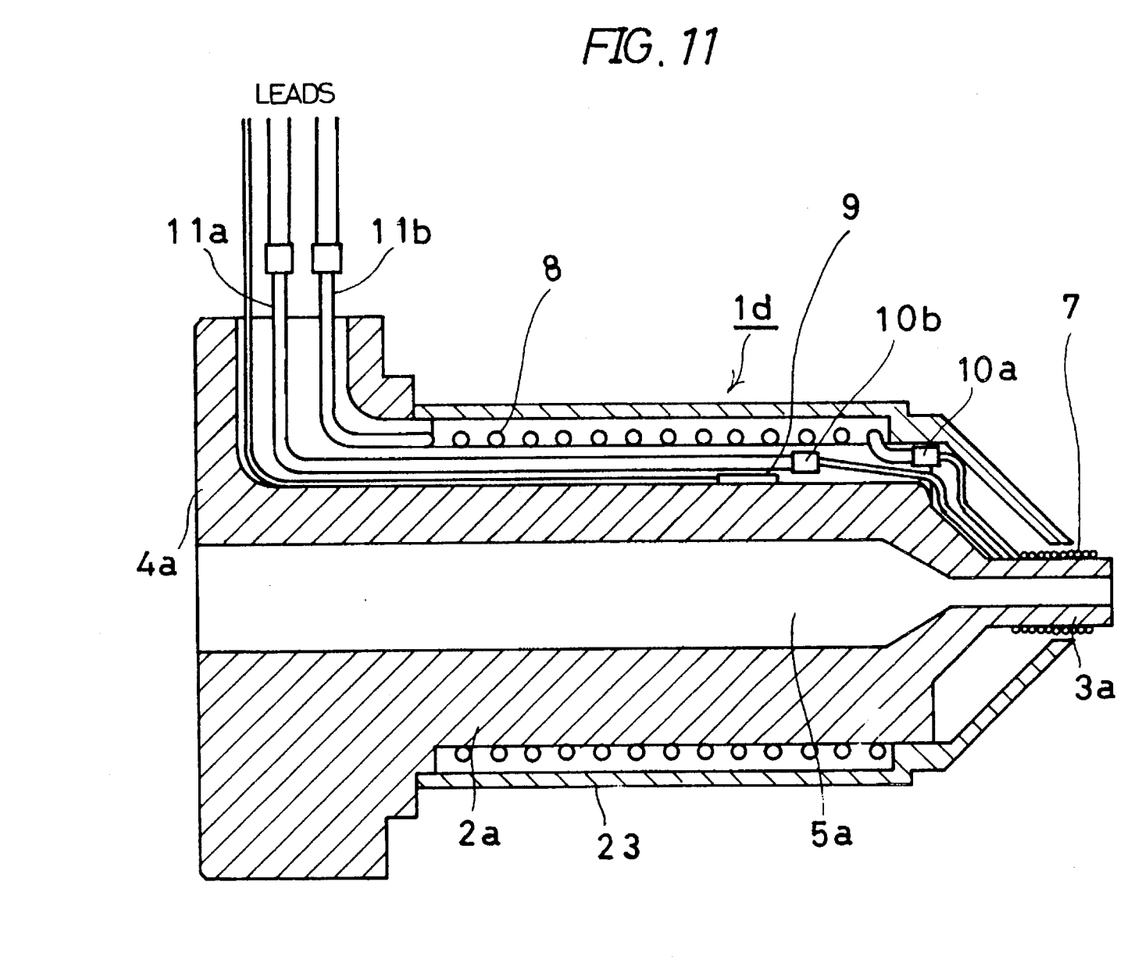
FIG. 11 is a sectional view showing a fourth embodiment of the probe.

FIG. 11 is a sectional view showing a fourth embodiment. Parts like those in the above embodiments are designated by like reference numerals, and their duplicate description is omitted.

This embodiment of the nozzle 1d is an externally heated nozzle. It has a central resin flow path 5a extending from the tip portion 3a of the nozzle to a stem 4a thereof and open at the opposite ends. The tip heater 7 which is made of platinum or a platinum alloy, is mounted on the outer periphery of the tip portion 3a of the nozzle. The body heater 8, which is made of nicrome, is mounted on the outer periphery of the body portion 2a of the nozzle. The outer side of both the heaters is covered by a nozzle outer cylinder 23.

The tip and body heaters 7 and 8 are made of the same materials as in the first embodiment. They each have their one end connected to the connection member 10a. A conductor connected by the connection member to the other end of the tip heater 7 and the other end of the body heater 8 are led out by leads 11a and 11b to the outside of the stem 4a of the nozzle for supplying power to the series tip and body heaters 7 and 8 from a single power source.

With the above structure, the same effects as with the first embodiment of the probe are obtainable in the externally heated system. In addition, by mounting the fourth embodiment of the nozzle, it is possible to obtain the same effects as in the previous embodiment of the injection molder.

Figure 12:
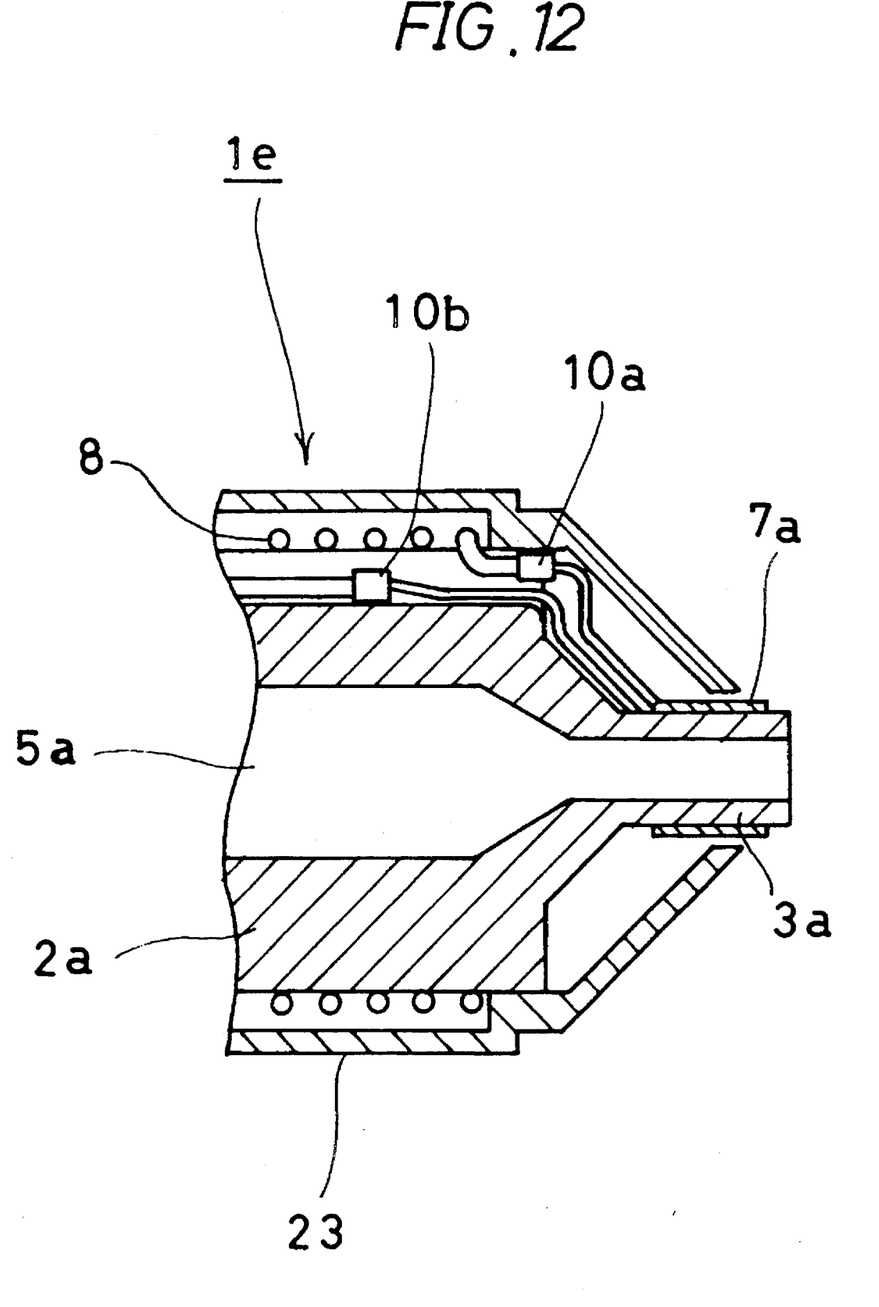
FIG. 12 is a fragmentary enlarged-scale sectional view showing a fifth embodiment of the probe.

FIG. 12 is a fragmentary enlarged-scale sectional view showing a fifth embodiment of the nozzle. Parts like those in the preceding embodiments are designated by like reference numerals and symbols, and their duplicate description is omitted.

This fifth embodiment of the nozzle 1e is an externally heated nozzle. While the tip heater 7 in the fourth embodiment of the nozzle was made of platinum or a platinum alloy, in this embodiment the same ceramic heat generator as the material of the tip heater 7a mounted in the second embodiment of the probe 1b is used. With the characteristics of the ceramic heat generator, it is possible to obtain the same effects as in the fourth embodiment, as mentioned before in connection with the second embodiment of the probe.

As modifications of the above fourth and fifth embodiments, it is possible to connect the two heaters in series with structures similar to that in the third embodiment of the probe 1c, in which the tip and body heaters 7 and 8 are connected in series by bonding one end thereof to the body portion 2 of the nozzle.

As has been described in the foregoing, with the nozzle for injection molding dies according to the invention, the rate of increase of the electric resistance with temperature increase caused by energization is greater with the tip heater than with the body heater, and also the tip and body heaters are connected in series for carrying the same current. Thus, when the temperature is increased by energization, the resistance of the tip heater is increased at a higher rate than that of the body heater, and the power consumption ratios of the tip and body heaters are changed, that is, the power consumption ratio of the tip heater is increased. In other words, the tip portion of the nozzle can be heated quickly, while the effect of heating on the body portion of the nozzle is not substantially changed.

Further, in the runnerless injection molder according to the invention, in which the above injection molder die probe is mounted in the die runner portion with tip portion disposed near the gate portion of the dies, with the supply of power (i.e., voltage or current) to the series tip and body heaters controlled in synchronism to the injection molding cycle, it is possible to quickly increase the temperature of the synthetic resin in the tip portion of the probe, i.e., the gate portion, so as to open the gate without substantial change caused in the temperature of the body portion of the probe. Also, with the cooling means for cooling each cavity portion provided in the injection molder dies the gate portion is also cooled down to lower the temperature of the synthetic resin in this portion so as to open the gate.

As shown, according to the invention:

1. With opening (intermittent opening) of the gate under control, it is possible to obtain runnerless molding free from threating of resin or the like;

2. With the control of a single power source circuit the operation control can be facilitated;

3. With the reduction of the number of power supply circuits it is possible to construct the runnerless injeciton molder readily, in small size and at reduced cost; and 4. For the gate land portion which requires high heat momentarily, the platinum heat generator capable of withstanding high temperature may be used to extend the life.

What is claimed is:

1. A probe for an injection molding die comprising a tip heater provided in a tip portion of the probe for locally heating said tip portion and a body heater provided in a body portion of the probe for heating said body portion, said tip heater being made of a material with the electric resistance thereof increased with temperature increase caused by energization, said body heater being made of a material with the electric resistance thereof less increased than said tip heater with temperature rise caused by energization, said tip and body heaters being connected in series with a power source for power supply control.

2. The probe for all injection molding die according to claim 1, wherein said tip heater is made of one of a platinum and a platinum alloy.

3. An injection mold assembly comprising an injection probe, which has a tip portion provided with a tip heater made of a material with the electric resistance increasing with temperature increase caused by energization and also has a body portion provided with a body heater made of a material with the electric resistance less increased than said tip heater with temperature increase caused by energization, said tip and body heaters being connected in series, said injection probe being mounted in a runner portion of a mold with said tip portion disposed near a gate portion of the mold, said injection mold assembly further comprising a power source unit connected in series with said tip and body heaters for power control in synchronism with a molding process.

4. The injection mold assembly according to claim 3, wherein said tip heater is made of one of a platinum and a platinum alloy.

* * * * *